| United States Patent [19] | [11] 4,145,465 |
|---|---|
| Sanderson et al. | [45] Mar. 20, 1979 |

[54] BACKING-FREE MASSIVE THICKNESS PRESSURE SENSITIVE ADHESIVE SHEET AND BONDING RIGID OBJECTS TO LARGER SURFACES

[75] Inventors: Frank T. Sanderson, Huntingdon Valley; Richard E. Zdanowski, Fort Washington, both of Pa.

[73] Assignee: Rohm and Haas Company, Philadelphia, Pa.

[21] Appl. No.: 412,231

[22] Filed: Nov. 2, 1973

Related U.S. Application Data

[63] Continuation-in-part of Ser. No. 117,159, Feb. 19, 1971, abandoned, Ser. No. 108,819, Jan. 22, 1971, Pat. No. 3,740,366, which is a continuation-in-part of Ser. No. 80,132, Oct. 12, 1970, abandoned, Ser. No. 19,571, Mar. 16, 1970, abandoned, which is a continuation-in-part of Ser. No. 819,598, Apr. 28, 1969, abandoned.

[51] Int. Cl.$^2$ ............... B60R 13/02; B60R 13/04
[52] U.S. Cl. .................. 428/31; 40/2 R; 40/594; 156/230; 156/309; 156/327; 156/334; 260/42.29; 260/42.37; 260/42.52; 283/18; 283/21; 428/40; 428/42; 428/323; 428/332; 428/343; 428/345; 428/463; 428/522; 428/339
[58] Field of Search ............... 161/165, 167, 251, 256, 161/138, 97, 406, 218, 221; 117/122 PA; 283/18, 21; 40/2 R, 125 A; 293/1; 260/86.1 E, 80.8, 42.52, 42.29, 42.37; 156/309, 230, 327, 334; 428/7, 31, 40, 42, 522, 343, 345, 463, 323, 328, 332, 339

[56] References Cited

U.S. PATENT DOCUMENTS

| 2,976,204 | 3/1961 | Young | 156/332 |
|---|---|---|---|
| 3,050,425 | 8/1962 | Carr | 161/251 |
| 3,284,423 | 11/1966 | Knapp | 161/218 |
| 3,439,950 | 4/1969 | Kunevicius | 161/161 |
| 3,625,795 | 12/1971 | Knechtges | 161/165 |
| 3,694,418 | 9/1972 | Fock | 161/251 |

OTHER PUBLICATIONS

"Eight-Mil Films Bond the F-111 Fuselage", *Machine Design*, p. 10, Jun. 10, 1965.

*Primary Examiner*—Ellis Robinson

[57] ABSTRACT

In manufacturing industrial products such as automobiles, it is known to adhere rigid solid objects such as emblems, the manufacturer's name, body trim, and so forth to the automobile body by means of a relatively thick sheet of resilient foamed plastic such as polyurethane, for example, 30 one thousands of an inch (30 mils) in thickness, coated on each face with a pressure sensitive adhesive. This provides a cushioning effect to take care of the wide variations in the uniformity of the emblems and further provides a cushion so that when the emblem is struck a blow it does not pop off as would be the case with a thin adhesive layer absent the foam layer.

The present invention, by providing a permanently pressure sensitive adhesive composition as a thick, backing-free sheet with the resilience of a soft rubber and certain critical characteristics as to the physical nature of the adhesive, makes it possible to completely eliminate the foam sheet and yet have a thick cushioning material which will permanently adhere the rigid body to the automobile or other surface. Specifically, the adhesive when cured retains its pressure sensitive characteristics, has the resiliency of a soft rubber, a thickness of 8 mils, and certain other critical physical characteristics relating to tensile strength, glass transition temperature, and elongation.

21 Claims, No Drawings

BACKING-FREE MASSIVE THICKNESS PRESSURE SENSITIVE ADHESIVE SHEET AND BONDING RIGID OBJECTS TO LARGER SURFACES

This application is a continuation-in-part of application Ser. No. 117,159, filed Feb. 19, 1971 now abandoned, Ser. No. 108,819, filed Jan. 22, 1971, and titled "Pressure Sensitive Adhesive Containing Carboxylic Acid Groups and Polyvalent Metal," now U.S. Pat. No. 3,740,366 which in turn is a continuation-in-part of Ser. No. 80,132, filed Oct. 12, 1970, Ser. No. 19,571, filed Mar. 16, 1970, which in turn is a continuation-in-part of Ser. No. 819,598, filed Apr. 28, 1969, the latter three now being abandoned.

This invention relates to a backing-free pressure sensitive adhesive sheet of a relatively massive thickness and having certain critical characteristics to enable its use to permanently adhere substantially rigid shaped bodies to a larger surface to which it conforms.

In the manufacture of industrial products such as automobiles, containing a substantially rigid shaped body on a surface thereof, examples of such bodies being the manufacturer's name, the model of the automobile, the dealer's name, body trim, and other emblems, the formerly used technique of using fastenings such as screws and bolts, spring clips, and the like is too time consuming and requires many manipulative steps such as applying the clips to the part, drilling holes in the auto body, and so on. An additional problem is that in some cases the reverse side of the automobile body skin is not accessible.

Pressure sensitive adhesive as normally used on one or two sided adhesive tapes in a thickness of 0.5 to 2 mils does not provide a satisfactory substitute. For example, a backing-free film of adhesive about 1 mil in thickness on a silicone coated release paper, or a plastic film 3 mils in thickness with a 1 mil film of adhesive on each side, when applied to a rigid applique such as an automobile dealer's name, which is then applied to a larger surface such as the trunk of an automobile, is not satisfactory for the reason that minor irregularities in the evenness of the emblem or of the automobile body result in breaking the contact between the adhesive and the emblem body or the automobile. Another reason is that physical blows to the emblem and vibrations tend to pop it loose because of the lace of cushioning involved. Permanent brittle cured glues are unsatisfactory for the same reason.

One solution which has been utilized in the past, shown, for example, by U.S. Pat. No. 3,439,950, is to utilize a resilient foamed polyurethane, neoprane, or a vinyl product, either as open celled or closed celled materials, in relatively great thicknesses as from one-sixteenth inch to one-fourth inch, each side of the foam being coated by a pressure sensitive adhesive of 1 mil or so in thickness, a product of this type being sold at present by at least one company. This essentially solves most of the problems inherent in simply using thin films of adhesive or thin double coated adhesive tape, but the cost of manufacturing the foam, of applying a coating to each side of it, and a release sheet such as silicone coated paper raises the cost of the product tremendously, as much as $5 to $10 per square yard being charged for such products. At such prices, the labor cost of reverting to mechanical fastenings is not unattractive.

It has now been found that a pressure sensitive adhesive having certain critical physical characteristics obtainable by the degree of chemical crosslinking of the adhesive and/or by the addition of certain bodying or reinforcing particles or pigments or fillers, utilized as a backing-free film in a certain critical thickness range, makes it possible to eliminate the need for the use of the foamed interlayer between the relatively rigid object and the larger surface, such as an automobile body, to which it is attached. By "backing" is meant a permanently laminated flexible film such as fabric, foam, plastic film, and the like. Instead of two layers of adhesive and a layer of foam, the present invention provides a single layer of adhesive. As with the foamed product containing release paper on each side, the products of the present invention can be die cut and applied to the emblem, applique, or object to be adhered at the point of use, or the emblems or the like can be made up with the single adhesive layer thereon and a release paper thereover.

The invention is found to be useful not only in attaching objects such as rigid emblems to automobile bodies, but also for mounting other rigid items such as pot and pan hooks in kitchens, wall-mounted product dispensing devices, electrical elements such as radio speakers, household objects such as vases, individual letters of signs wherein the letters are in relief, name plates, labels for doors, metallic specification labels for machinery such as electric motors, and other relatively rigid objects which are attachable to larger solid surfaces.

It is essential that certain critical properties be present in the adhesive which would not necessarily be required for a pressure sensitive adhesive used in the normal thickness of 0.5 to 2 mils, or in other terms, in an amount less than about 1 pound per 50 square feet of surface.

These properties include a relatively massive thickness of from 8 to 125 mils, preferably 10 to about 70 mils, and more preferably below about 40 mils, a Tg of below 0° C., preferably below −15° C., a tensile strength of from about 15 to 60 psi, and a percent elongation at break of from 500 to 3000 percent. It is preferred that the adhesive sheet have an elastic recovery of from 50 to 90 percent, a Williams' plasticity of from 2 to about 5, a maximum creep distance of 0.1 inch, more preferably 0.05 inch, and substantially 100 percent elastic recovery when a one inch square thereof is compressed in a direction perpendicular to the surface of the sheet of adhesive under a weight of 4 to 25 pounds for 0.1 to 20 minutes. The test methods are described below.

The preferred manner of obtaining a product having these characteristics is by the use of crosslinking mechanisms to crosslink polymers in the adhesive. Another useful means is the inclusion of a very finely divided inorganic bodying agent. Combinations of the two are particularly useful.

The pressure sensitive adhesive is preferably an addition polymer, particularly one comprising acrylic monomers.

One of the monomers utilized in a substantial proportion to prepare the preferred pressure sensitive adhesive is a tackifying or "soft" monomer which may be represented by the following formula:

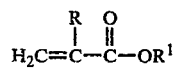

wherein R is H or alkyl having 1 to 4 carbon atoms and R$^1$ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like, said radicals R$^1$, when alkyl, having from 2 to about 14 carbon atoms, preferably from 3 to 12 carbon atoms, when R is H or methyl. When R is alkyl and R$^1$ is alkyl, R$^1$ should have from about 6 to about 14 carbon atoms and when R is H and R$^1$ is alkyl, R$^1$ should have from about 2 to about 12 carbon atoms, in order to qualify as a tackifying monomer.

As is known, for a given number of carbon atoms in the alcohol moiety, the extent and type of branching markedly influences the Tg, the straight chain products giving the lower Tg.

As is apparent, an important property of the polymer is the Tg thereof, and consequently the selection of monomers and proportions thereof depends upon their influence on the Tg. The Tg of the polymer must be below 0° C. (i.e., it must give a tacky coating) and is preferably below 31 15° C. "Tg" is a conventional criterion of polymer hardness and is described by Flory, "Principles of Polymer Chemistry", pp. 56 and 57, (1953), Cornell University Press. While actual measurement of the Tg is preferred, it may be calculated as described by Fox, Bull. Am. Physics Soc. 1, 3, p. 123 (1956). Examples of the Tg of homopolymers and the inherent Tg thereof which permits such calculations are as follows:

| Homopolymer of | Tg |
|---|---|
| n-octyl acrylate | −80° C. |
| n-decyl methacrylate | −60° C. |
| 2-ethylhexyl acrylate | −70° C. |
| octyl methacrylate | −20° C. |
| n-tetradecyl methacrylate | −9° C. |
| methyl acrylate | 9° C. |
| n-tetradecyl acrylate | 20° C. |
| methyl methacrylate | 105° C. |
| acrylic acid | 106° C. |

These or other monomers are blended to give the desired Tg of the copolymer. For example, a large proportion (e.g., 90 percent by weight) of a combination of 3 parts of acrylic acid or methacrylic acid and 87 parts of methyl acrylate (all "hard" monomers) with a small proportion (e.g., 10 percent) of octylacrylate (a "soft" monomer) provides a copolymer having the desired Tg. Most of the esters of acrylic acid or methacrylic acid having a low Tg are well known in the pressure sensitive adhesive art as tackifying monomers.

Other ethylenically unsaturated copolymerizable monomers having a Tg of above 0° C. are useful in combinations with the above mentioned tackifying monomers provided they do not adversely effect the desired properties of the adhesive (e.g., unduly raise the overall Tg) and do not seriously interfere with the crosslinking by the polyvalent metal. These may be represented by the formula:

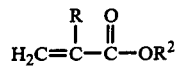

wherein R is as above. R$^2$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolacrylamide.

The proportions of the monomers fall within the following ranges:

| Monomer | Approximate Parts by Weight | | |
|---|---|---|---|
| | Useful Range | Preferred Range | Most Preferred Range |
| Tackifying monomer | 10–99.95 | 50–99.7 | 70–99.5 |
| Unsaturated carboxylic acid monomer or other functional monomer | 0.05–20 | .3–10 | 0.5–4.5 |
| Other monomers | 0–89.95 | 0–49.7 | 0–29.5 |

The total of the monomers is 100 parts. These ranges, however, should not be construed as the only useful specification because the most important criteria as far as polymer composition is concerned is the glass temperature (Tg) of the polymer and not the ratio of the individual monomers. The useful range of the polymer Tg is 0° C. or less, preferably −15° C. or less.

The preferred emulsion copolymer, having a molecular weight of between about 70,000 and 2,000,000, and preferably between about 250,000 and 1,000,000 is made by the emulsion copolymerization of the several monomers in the proper proportions. Conventional emulsion polymerization techniques are described in U.S. Pat. Nos. 2,754,280 and 2,795,564. Thus, the monomers may be emulsified with an anionic, a cationic, or a nonionic dispersing agent, about 0.05 percent to 10 percent thereof ordinarily being used on the weight of the total monomers. The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalyst, may be used in proportions of 0.1 percent to 10 percent each based on the weight of monomers to be copolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, such as the oleates or stearates or morpholine, 2-pyrrolidone, triethanolamine or mixed ethanolamines, or any of the nonionic types, such as ethylene oxide-modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful.

Although emulsion polymers are preferred, polymers prepared in organic solutions, e.g., in xylene, methyl "Cellosolve" and the like, by well-known conventional means such as free-radical initiation with benzoyl peroxide or the like are also useful. Solution polymers useful in the invention preferably have a molecular weight of between about 10,000 and 1,000,000.

There are essentially three types of crosslinking which can be used. These are (1) crosslinking during addition polymerization by using polyunsaturated monomers, (2) crosslinking subsequent to polymerization (latent crosslinking) by including monomers in the polymer recipe which have functional groups capable of crosslinking by various mechanisms including self-crosslinking, or mutual crosslinking by different functional groups, both in the polymer chain, and (3) latent crosslinking by means of an external separately added chemical compound.

The adhesive is preferably subject to latent crosslinking. Where addition polymers are involved, monomers which are suitable for this function include certain acrylics having crosslinkable functionality exemplified by the following: acrylic acid; methacrylic acid; acrylamide; methacrylamide; epoxalkyl acrylates or methacrylates, e.g., glycidyl methacrylate; monoacrylic acid esters of glycols; hydroxyalkyl acrylates or methacrylates, isocyanatoalkyl acrylates and aminoalkyl acrylates or methacrylates, as well as other compounds described below.

Examples of the crosslinking reactions which are possible using heat, aging, and/or catalysis are:

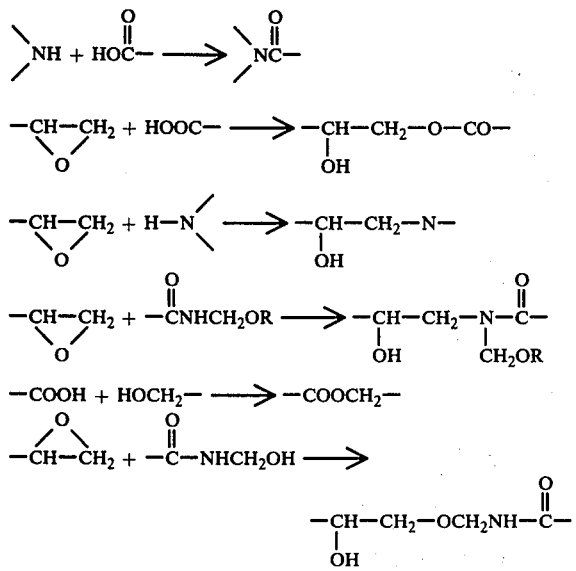

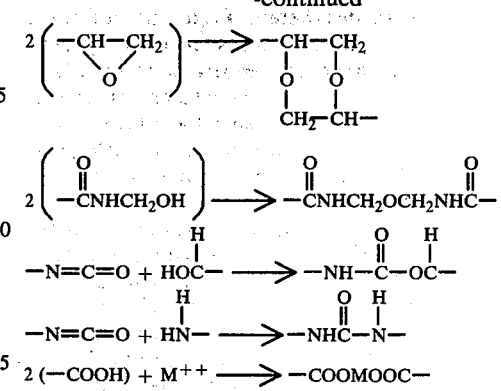

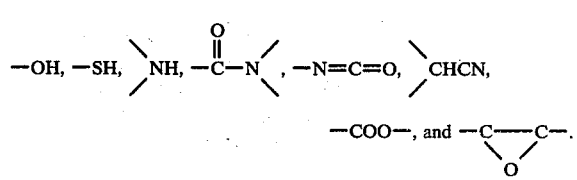

In the above, $M^{++}$ in a divalent metal ion such as zinc or zirconium. Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

As may be seen, the crosslinkable addition polymerizable unsaturated monomers have reactive polar groups selected from those including $-OH, -SH, \diagdown NH, -\underset{\underset{O}{\parallel}}{C}-N\diagup, -N=C=O, \diagdown CHCN,$ $-COO-$, and $-C\underset{O}{\overset{}{---}}C-$.

Such groups may be included as are mutually or self-crosslinkable, or separate crosslinking compounds may be added, as is well known.

There is thus included within the copolymer up to 20 percent by weight of such functional, polar, or reactive monomer, preferably an unsaturated carboxylic acid, half esters and half amides of α-unsaturated dicarboxylic acids, and salts thereof with ammonia, an alkali-metal, such as sodium, potassium or lithium, or with a volatile water-soluble amine such as dimethylamine or triethylamine, in order to provide the crosslinking functionality. Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are consideredd to be "α,β-unsaturated monocarboxylic acids", and the term as used herein includes such esters and amides.

In addition to or in place of the acids, acrylamide, methacrylamide, 2-sulfoethyl methacrylate, the materials disclosed in U.S. Pat. Nos. 3,446,777 to W. D. Emmons, 3,150,118 D. H. Clemens, and 3,266,930 to W. D. Emmons and E. Hankins Owens, and various other functional, polar, or monomers having groups which remain reactive after the polymer is formed, for example, falling within the definitions of formulas II, III, IV, and V, are also useful, as follows:

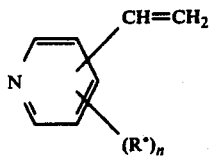
(II)

where
R° is selected from the group consisting of H and alkyl groups having 1 to 4 carbon atoms, and
n is an integer having a value of 1 to 4, $$CH_2=C(R)AYNR^1R^2 \quad (III)$$

where
R is selected from the group consisting of H and $CH_3$,
A is selected from the group consisting of O, S,

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms,

(IV)

where
R is the same as above, and
Z is an alkylene group having 2 to 3 carbon atoms.

Examples of compounds of formula II include: 2-vinylpyridine; 2-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine, 2,6-diethyl-4-vinylpyridine.

Examples of compounds of formula III include: dimethylaminoethyl acrylate and methacrylate; diethylaminoethyl acrylate and methacrylate; dimethylaminopropyl acrylate and methacrylate; diethylaminopropyl acrylate and methacrylate; dipropylaminoethyl acrylate and methacrylate; di-n-butylaminoethyl acrylate and methacrylate; di-sec-butylaminoethyl acrylate and methacrylate; di-t-butylaminoethyl acrylate and methacrylate; dimethylaminoethyl vinyl ether and sulfide; diethylaminoethyl vinyl ether and sulfide; aminoethyl vinyl ether and sulfide; monomethylaminoethyl vinyl ether and sulfide; N,N-dimethylaminoethyl acrylamide and methacrylamide; N,N-diethylaminoethyl acrylamide and methacrylamide.

Examples of compounds of formula IV include:
N-[β-(α-methacryloxyacetamido)ethyl]-N,N'-ethyleneurea;
N-[β-(α-acryloxyacetamido)ethyl]-N,N'-ethyleneurea;
N-[β-(α-acryloxyacetamido)ethyl]-N,N'-trimethyleneurea;
N-[β-(α-methacryloxyacetamido)ethyl]-N,N'-trimethyleneurea.

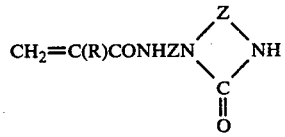
(V)

where R and Z are as defined above, of which an example is N-[β-(methacrylamido)ethyl]-N,N'-ethyleneurea.

Generally, such functional monomers are present in amounts of from 0.50 to 20 percent, preferably from 0.3 to 10 percent by weight, and more preferably 0.5 to 4.5 percent, based on the total monomers that form the coating resin.

As to the use of polyunsaturated monomers to achieve crosslinking during polymerization, well-known examples are divinyl compounds such as divinyl benzene, divinyl ether, glycol methacrylates and acrylates such as glycol dimethacrylate, diallyl maleate, and so on. This type of crosslinking is less preferred than utilizing postpolymerization reaction to achieve the crosslinking, but when used, it is used in very small amounts, normally from 0.05 to 5 parts and preferably from 0.1 to 0.5 parts per 100 parts of total monomers by weight.

The separate added crosslinker, when used, is useful with or without the use of mutual crosslinking groups and self-crosslinking groups. Among the external crosslinking methods or compounds is the use of organic peroxides such as benzoyl peroxide; the use of epoxy resins such as that obtained from bis-phenol A and epichlorohydrin; esterification, by means of dicarboxylic acids reacting with hydroxyl groups in the polymers, or by reacting diols or polyols such as neopentyl glycol, trimethylol propane, trimethylol ethane, or ethylene glycol with carboxyl groups in the polymer; use of aminoplasts such as melamine formaldehyde, urea formaldehyde, or butylated melamine formaldehyde; diamines and polyamines such as hexamethylene diamine, ethylene diamine, and the Versamids; polyisocyanates such as toluylene diisocyanate; polyvalent metal compounds reactive with carboxyl groups, such as zinc octoate and tetrabutyl titanate for organic solvent based systems, or zinc ammonium carbonate or zirconium acetate for aqueous systems; compounds with mixed functionality such as ethanolamine, and other well-known external crosslinkers. The invention is not in the use of crosslinking per se but in the utilization of crosslinking and/or the bodying agent to obtain the unique physical characteristics of the adhesive of the invention.

While emphasis has been placed on pressure sensitive adhesives obtained by addition polymerization, particularly the acrylics, other known pressure sensitive adhesives can be modified in accordance with the invention to the desired extent. For example, one known type of crosslinked pressure sensitive adhesive is crude rubber in which 3 percent of the polymer is combined maleic anhydride. Similarly, butadiene-styrene polymers and butadiene-acrylontrile polymers containing 3 percent to 5 percent carboxylated groups are useful. In each case, external crosslinkers such as epoxy resins are used.

When a polyvalent metal compound compatible with the aqueous or organic solvent system is used as the crosslinker, it may be either a simple ionic compound or a metal complex or a metal chelate, which is at least partially ionizable or soluble in the system. The polyvalent metals are selected from Groups I-B, II-A, II-B, III-B, IV-B, V-B, VI-B, VII-B, VIII, III-A, IV-A, V-A, and VI-A of the periodic table. Preferably, the polyvalent metal is selected from the Groups II-B and IV-B. Suitable polyvalent metals include: copper, gallium, tin, cerium, titanium, vanadium, chromium, molybdenum, manganese, iron, cobalt, nickel, beryllium, cadmium, calcium, magnesium, zinc, zirconium, barium, strontium, aluminum, bismuth, antimony, lead, cobalt, or any other polyvalent metal which can be added to the composition by means of an oxide, hydroxide, or basic, acidic, or neutral salt or other compound or complex which has appreciable solubility in water or other liquid, such as at least about 1 percent by weight therein. Zinc, cadmium, and zirconium compounds are preferred. The selection of polyvalent metal and the anion are governed by the solubility of the resultant metal complex or compound in the liquid medium used.

Examples of the organic and inorganic metal salts and compounds include carboxylic acid salts and chelates, such as zinc acetate, zinc benzoate, tin tartrate, lead acetate, chromium acetate, manganese tartrate, manganese benzoate, magnesium citrate, ferrous acetate, iron lactate, nickel acetate, cobalt acetate, cobalt benzoate, cobalt propionate, copper acetate, chelates or complexes which involve coordination bonding and may be partially ionizable such as the zinc chelate of alanine or glycine, calcium chloride, aluminum diacetate, magnesium acetate, calcium carbonate, zirconium acetate, calcium acetae, calcium hydroxide, barium acetate, magnesium chloride, manganese sulfate, ammonium complexes such as of zinc benzoate, zinc carbonate, or zinc sulfate, and the like. Any salt or chelate having both ionic and coordination bonding in which the metal is sufficiently available or dissocialbe to bind the carboxyl groups of the polymer is useful.

The ammonia and amine complexes (and especially those coordinated with $HN_3$) of these metals are paticularly useful. Amines capable of so complexing include morpholine, monoethanol amine, diethylaminoethanol, and ethylenediamine. Polyvalent metal complexes (salts) of organic acids that are capable of solubilization in an alkaline pH range may also be employed. Such anions as acetate, glutamate, formate, carbonate, salicylate, glycollate, octoate, benzoate, gluconate, oxalate and lactate are satisfactory. Polyvalent metal chelates wherein the ligand is a bidentate amino acid such as glycine or alanine are particularly preferred. The polyvalent metal compound must be such that the metal is available to serve its crosslinking function, i.e., it is dissociable to some extent to form polyvalent metal-containing ions, or it is attracted to the carboxyl groups by an equivalent mechanism. It is not intended that the invention be limited by these or other theories or hypotheses of the mechanism performed by the cooperation between the metal compound and the carboxyl groups of the polymer. "Crosslinking" as used herein is intended to cover any of the possible phenomena or mechanisms by which the polyvalent metal modifies the adhesive of the invention.

Preferred polyvalent metal compounds, complexes and chelates include zinc acetate, cadmium acetate, zinc glycinate, cadmium glycinate, zirconium carbonate, zinc carbonate, cadmium carbonate, zinc benzoate, zinc salicylate, zinc glycollate and cadmium glycollate. Although the polyvalent metal compound may be added to the adhesive composition in dry form such as a powder, it is preferred to first solubilize the polyvalent metal compound using a fugitive ligand such as ammonia or a volatile amine. For purposes of this invention a ligand is considered fugitive if at least a portion of said ligand tends to volatilize under the film forming conditions utilized. Since the ammonia may complex with the polyvalent metal compound, a compound such as zinc glycinate, when solubilized in dilute aqueous ammonia solution, may be named zinc ammine glycinate or zinc ammonium glycinate.

A group of polyvalent metal complexes employed in adhesive formulations of this invention contain a polyvalent metal moiety, an organic bidentate amino acid ligand moiety and generally, if the chelate is added to the formulation in solubilized form, an alkaline moiety. The polyvalent metal ions may be those named above such as beryllium, cadmium, copper, calcium, magnesium, zinc, zirconium, barium, strontium, aluminum, bismuth, antimony, lead, cobalt, iron, nickel, or any other polyvalent metal which can be added to the composition by means of an oxide, hydroxide, or basic, acidic, or neutral salt chelate, or complex which has appreciable solubility in water, such as at least about 1 percent by weight therein. The alkaline moiety may be provided by ammonia or an amine. The amino acid bidentate ligand is preferably an aliphatic amino acid, but may also be a heterocyclic amino acid.

Preferred polyvalent metal complexes include cadmium glycinate, nickel glycinate, zinc glycinate, zirconium glycinate, cobalt alaninate, copper alaninate, zinc alaninate, copper $\beta$-alaninate, zinc $\beta$-alaninate, nickel norvalinate, zinc valinate and copper dimethylaminoacetate.

The polyvalent metal complex or coordinate compounds are initially readily soluble in the aqueous or organic medium of the pressure sensitive adhesive composition, especially at a pH of 6.5 to 10.5 in an aqueous system, and have the advantage of drying to form an adhesive which is essentially insoluble in water. The polyvalent metal complex may also be added to the water-insoluble emulsion copolymer in solubilized form. This is accomplished by solubilizing the metal complex in an alkaline solution such as dilute aqueous ammonia. Since the ammonia may complex with the polyvalent metal coordinate compound, a compound such as cadmium glycinate, when solubilized in an aqueous ammonia solution, may be named cadmium ammonium glycinate. Other polyvalent metal complexes described in this invention may be similarly named.

The polyvalent metal complexes used with the latices must be stable in an alkaline solution; however, a complex that is too stable is undesirable since dissociation of the metal ions would be retarded during film formation of the coating.

The polyvalent metal compound used is employed in an amount so that the ratio of polyvalent metal to the carboxyl groups of the α-β-ethylenically unsaturated acid or other polymerizable carboxylic acid of the addition polymer varies from about 0.01 to 2.0, and preferably from about 0.05 to 1.5. This is expressed on an equivalency basis as the ration of metal, such as $Zn^{++}$, to —COOH or —COONH$_4$ groups, a ratio of 0.5 being stoichiometric. When the polymer is a dispersion or emulsion and the metal is calcium and/or magnesium, it may even be supplied in whole or in part by the use of hard water, contrary to the usual practice of making emulsion polymers and formulating them with deionized or distilled water. It is preferred at the higher levels of carboxylic acid content to use proportionately less polyvalent metal; the proportions are chosen so that the adhesive remains tacky but yet has good cohesive strength. In some cases excess metal compound has no deleterious effect.

The preferred aqueous dispersion when finally formulated as an adhesive composition should have a pH of 2.0 to 10.0 or more. Most advantageously, its pH is from 6.5 to about 9.5. Suitable alkaline or buffering agents such as borax, sodium hydroxide, ammonia, or amines such as diethylamine, triethylamine, morpholine or triethanolamine may be introduced to adjust the pH to the desired value. At least a portion of the alkaline material must be such that it is volatilized upon curing the adhesive coating so that the polyvalent metal ions may perform their ionic crosslinking or equivalent function to link or bind carboxyl groups.

In many cases, known pressure sensitive adhesives which would not be satisfactory in the extraordinarily thick coatings of the invention, because of lack of cohesiveness and a tendency to undergo cold-flow and to slump, can nevertheless be utilized in accordance with the invention when the extent of crosslinking is increased and/or a finely divided material which may be called a bodying agent is included in the composition. This could also be termed an antislump agent, or, as in the rubber industry, it may be called a reinforcing pigment. The manner is which the finely divided bodying agents function is not understood, but they do function to stiffen and apparently reinforce the adhesives and make them more rubbery. Among useful bodying agents are the very finely divided channel carbon blacks, zinc oxide, calcium carbonate, calcium silicate, amorphous hydrated silica, amorphous hydrated alumina, the clays, and magnesium carbonate. Particularly preferred is amorphous or colloidal silica. The particle size of such inorganic bodying agents should be less than 25 microns, preferably less than 5 microns, and still more preferably less than 3 microns. Particles in the colloidal range, less than 0.1 micron, are also useful. These bodying agents in general increase the stiffness of the adhesive and the resistance to creep, slump, and cold-flow. The amounts needed are often not such as give a decided pigmenting effect. In some cases, the bodying agent is not needed, as when the extent and type of crosslinking is such as to give the adhesive the required rubberyness for the paticular utility involved. Where such increased crosslinking would lower the adhesiveness to an undesired degree, such bodying agent is useful. The amounts preferably range from about 1 part to 100 parts of polymer solids to 15 parts per 100 parts of polymer solids, preferably from 2 to 10 parts per 100 parts of polymer solids, on a weight basis.

Conventional additives for pressure sensitive adhesives are also useful, examples including fillers or pigments, tackifier resins such as wood rosin, polyesters and the like, plasticizers such as the alkyl esters of adipic or phthalic acids, antioxidants, organic thickening agents such as polyacrylic acid and polyvalent metal salts thereof, solvents such as alkanols having 1 to 12 carbon atoms, an example being isopropanol, foam suppressors and so forth. To some extent, fibrous fillers such as cellulosic fibers or nylon staple may be employed. These additives are incorporated in the aqueous dispersion, nonaqueous dispersion, or solution prior to coating the substrate or strippable carrier therewith.

The adhesive of the present invention has found to provide exceptionally good bonds with numerous substrates, including wood, Formica brand decorative laminates, other plastic materials such as methyl methacrylate polymer, polyvinyl chloride, saran, polyethylene glycol terephthalate, nylon, phenolformaldehyde resins, urea-formaldehyde resins, and other thermoset materials such as melamine-formaldehyde resins; linoleum, asphalt tile, vinyl tile, ceramic tile, various silicates such as glass, concrete, asbestos cement, plaster, metals such as aluminum, steel, iron, copper, zinc, chromium, and nickel, and especially painted, lacquered, or enameled surfaces, such as painted automobile bodies, woodwork, walls ceilings, or floors.

The adhesive composition may be cooled or substantially colorless. Besides depending on the color of the bodying agents, suitable colored pigments may be added. Also, if desired, direct dyes may be introduced to provide a desired color.

The backing-free pressure sensitive adhesive sheet is applied to the rigid body or release coated support in various ways. One method is to apply an aqueous dispersion of the polymer to the base, particularly if an emulsion polymerized polyer is used followed by heating to achieve crosslinking. Any conventional coating method is useful.

In the following examples, which are illustrative of the invention, the parts and percentages are by weight unless otherwise noted.

While the polymer of the invention is preferably an aqueous dispersion or an organic solvent solution prepared in those mediums, it may also be used and/or prepared as a nonaqueous dispersion, a bulk polymerizate, an organic solvent solution of the polymer emulsified in water, and the like.

EXAMPLE 1

A glass bottle is charged with 100 grams of distilled water and a Teflon-covered magnetic stirrer bar. The container is placed on a magnetic stirring plate, and stirring speed adjusted to give a vortex reaching nearly to the bottom of the liquid. Zinc oxide (22 grams) is sifted into the water and stirred until a well-mixed slurry is obtained. At this point, 40 ml. of 28 percent ammonium hydroxide are added, followed by 42 grams of glycine, and stirring continued until a clear solution is obtained.

A second container is charged with 100 grams of an aqueous dispersion containing 55 weight percent of a tacky acrylic emulsion copolymer prepared in a conventional manner of a 98/2 weight ratio mixture of butyl acrylate and methacrylic acid. The emulsion is stirred using a magnetic stirrer assembly, and zinc ammonium glycinate solution, prepared as described above, is added in an amount to give about 0.25 equivalents of zinc per carboxyl. After mixing for several minutes, an aqueous solution of 7 percent ammonium hydroxide is added to the emulsion until the pH is raised to 9.5 as indicated by a Leeds and Northrup Model 7400-A-2 pH meter.

100 gm. of the adhesive emulsion is charged to a stirred reactor. Stir slowly while adding 1.1 gm. of Gantrez M-155[1]. Allow to stir for fifteen minutes before adding 1.0 gm. of ethylene glycol and continue stirring slowly. Finally add 3.3 gms. of Cab-O-Sil M-5[2] and continue to stir until a smooth, creamy mastic mixture is obtained.

[1] Polyvinyl Methyl Ether available from General Aniline & Film Corporation [2] Colloidal silica available from Cabot Corporation

Dry Film Preparation and Williams Plasticity Number

A film of the finished mastic is cast on 7 mil silicone-treated release paper by use of a Garnder knife set to a 30 mil gap. After several hours of drying, the sample is baked in an air circulating oven at 190° F. for fifteen minutes. Dry film thickness of the free film of adhesive is 12 mils. A two gram specimen of the mastic is peeled from the release paper and rolled into a ball of 14 to 17 mm. diameter. This ball is placed on a second sheet of silicon-treated release paper and placed in an oven at 100° F. After a five minute equilibration period, a 5000 gram load is placed on the ball and left for fifteen minutes. The height of the adhesive ball (in millimeters) after the fifteen minutes, 100° F. exposure under a 5000 gram loading is termed the Williams Plasticity Number. Williams Plasticity Number for this mastic is found to be approximately 3.

Tensil Strength, Elongation and Percent Recovery

A laminate is prepared by placing a sheet of silicone-treated release paper over release paper which had been coated with a 12 mil dry film of mastic prepared as described. Dumbbell-shaped specimens of this sandwich are cut 3" long by ¾" wide and which have neck widths of 174". The release paper covers are slit so that release paper covers could be peeled from the body section of the dumbbell. The bell portions of the specimens are placed in the jaws of an Instron Tester Model F/TM. A 0.5 inch opening separates the jaws. The samples are stretched at a rate of 0.2 inches per minute until sample failure. These pressure-sensitive films are found to have a maximum tensile strength of 40 psi and an elongation of 1300 percent at break. A second set of dumbbell-shaped specimens prepared as above are placed in the Instron tester and jaw opening set at 0.5 inches. Jaw opening is increased to 0.625 inches at a rate of 0.2 inch per minute and allowed to return to the 0.5 inch opening at the same rate. The adhesive films recover about 80 percent of their original length.

Panel Painting

Stainless steel panels are primed with a typical red oxide pigmented epoxy primer using a spray gun set at 50 pound pressure. The primed panels are baked 45 minutes at 285° F. and lightly dry sanded with No. 600 "wet-or-dry" sand paper. These panels are then top-coated with a thermoplastic acrylic auto lacquer pigmented black and diluted with a mixture of aromatic, ketone, and ester solvents. The lacquer is spray applied at a pressure of 50 pounds and baked at 190° F. for ten minutes. Following this baking period, the panels are lightly wet sanded wit the No. 600 "wet-or-dry" sand paper and rebaked for thirty minutes at 310° F. The coated panels, 4" by 10" by 1/16", are conditioned 24 hours at 78° F. and 50 percent relative humidity.

Peel Adhesion Test

A 12 mil dry film of the adhesive of Example 1 is transferred from the silicon-treated release paper to a sheet of 3 mil polyethylene terephthalate. This pressure sensitive adhesive film, cut into 1" by 8" strips, is then applied to steel panels coated with auto lacquer as shown above. A 4.5 pound roller is passed over the laminates twice to insure proper bond formation. After twenty minutes aging, adhesion is determined by peeling the polyethylene terephthalate tapes from the coated panels at 180° angle at 10 inches per minute using an Instron Tester Model F/TM. Adhesion of the pressure sensitive adhesive tapes to the painted panels if found to be about 10 pounds per inch. For a thermoplastic acrylic auto lacquer, peel adhesion should be at least 2 pounds per inch, preferably at least 6 pounds per inch. It will differ with different substrates.

Creep Testing

Another 12 mil dry film of the pressure sensitive adhesive of Example 1 is transferred from the silicone-treated release paper to a chrome plated die-cast bar which is 3 ⅝" by ¾" by ⅛". A ¼" wall of chrome-plated metal surrounds the die-cast bar, and one end of the wall is punctured to provide a hanger from which weights could be suspended. The adhesive-coated bar is placed on one of the steel panels coated as described above. A pressure of 25 psi is placed on the laminate for one minute, the removed.

After conditioning 24 hours at 78° F. and 50 percent relative humidity, the laminate is placed in an oven at 158° F. A 250 gram weight is attached to the bar, and the entire assembly suspended in a vertical position. After one week at 158° F. under a 250 gram load, the test bar moves only 0.02 inch.

Impact Testing

Another chrome bar-adhesive film-painted panel laminate is prepared as shown above and then placed horizontally on two pedestals so that the bar is on the lower face and is suspended. A one pound weight is dropped from a distance of 15 inches onto the laminate, striking the rear face behind the bar. The chrome bar is not jarred from the panel after several reptitions of this reverse impact test.

EXAMPLE 2

An acrylic emulsion copolymer based on 98 weight percent butyl acrylate and 2 weight percent methacrylic acid is treated with half the amount of zinc glycinate as the product described in Example 1, and pH is raised to 9.5. Mixing techniques are identical to those described above. Test samples are prepared and evaluated using the same methods as those used in studying the product of Example 1. The product is similar to that of Example 1.

EXAMPLE 3

An adhesive sheet prepared as in Example 1 but containing an emulsion polymer prepared from 80 parts isobutyl acrylate, 15.5 parts methyl methacrylate and 4.5 parts acrylic acid, and zirconium acetate in an amount to give a $Zr^{++}$ to —COOH or —COONH$_4$ ratio on an equivalent basis of .1, is formed into a mastic and tested as in Example 1, with similar results.

EXAMPLE 4

Repeating Examples 1 to 3 but using zinc alaninate and zirconium alaninate as the metal compound gives similar results. Any of the soluble or solubilized metal compounds disclosed above are also useful.

EXAMPLE 5

Charge 100 gm. of the adhesive from Example 1, 1.1 gm. Gantrez M-155 to the reactor as in Example 1 above. While stirring slowly, add 1.0 gm. of a polyacrylic acid thickener. Continue to stir while adding 3.3 gm. Cab-O-Sil M-5 and stir until a smooth, creamy mixture is obtained. Add 2 gm. of ammonium hydroxide and stir for about 5 additional minutes.

A film of the finished mastic is cast on polyethylene terephthalate film by use of a Gardner knife set to a 30 mil gap. After several hours of air drying, the sample is baked in an air circulating oven at 190° F. for 15 minutes. Following storage at 78° F. and 50 percent relative humidity for about 36 hours, a strip 1" by 8" is cut for testing. The strip is applied to the painted steel panel prepared as in Example 1 and a 4.5 pound roller is slowly passed over the laminate twice to insure proper bond formation. After 20 minutes of laminate aging, adhesion of each sample is measured by peeling the samples at a 180° angle at 10 inches per minute using an Instron tester Model F/TM. The peel adhesion is 9.4 pounds per inch.

The following adhesives, modified in accordance with the invention to have the degree of crosslinking and proper body by the use of bodying agents, as in Example 1, to provide the critical physical properties of the adhesive free film, are useful in accordance with the invention.

EXAMPLE 6

An emulsion polymer of 600 grams of 2-ethylhexyl acrylate, 1.4 grams of triethylene glycol dimethacrylate, and 150 grams of dimethylaminoethyl methacrylate, prepared by sequential addition of monomers.

EXAMPLE 7

A solution polymer in ethyl acetate and toluene of 35 parts of vinyl acetate, 60 parts of ethylhexyl acrylate, and 5 parts of hydroxyethyl methacrylate to which polymer is added .12 equivalents of tetrabutyltitanate per equivalent of active hydrogen.

EXAMPLE 8

An emulsion polymer of 12.5 parts of maleic acid monoester of 2-(t-butylamino)ethanol, 10 parts of ethyl acrylate, and 73.6 parts of 2-ethylhexyl acrylate, the latex also containing 1 percent tetraethylenepentamine and 1 percent Epoxide 201.

EXAMPLE 9

A solution polymer in ethyl acetate-hexane of 64 parts of 2-ethylhexyl acrylate, 30 parts of ethyl acrylate, 5 parts of acrylic acid, and 1 part of glycidyl methacrylate.

EXAMPLE 10

A solution polymer of 50 parts of vinyl acetate, 50 parts of octyl acrylate, and 4 parts of N-methylolacrylamide, in an ethyl acetate, methyl alcohol, and isopropyl alcohol solvent.

EXAMPLE 11

An emulsion polymer of 96 parts of isooctyl acrylate and 4 parts of acrylic acid containing 1.5 parts of ethanolamine crosslinker per 100 parts of copolymer.

EXAMPLE 12

A solution polymer of 80 percent butyl acrylate and 20 percent acrylic acid is crosslinked with trimethanolethane by means of paratoluene sulfonic acid esterification catalyst.

EXAMPLE 13

A solution of a butadiene-acrylonitrile copolymer, 2.5 percent carboxylated, by weight, blended with an equal weight of the epoxy resin obtained from 2,2-bis(4-hydroxyphenyl) propane and epichlorohydrin, in the ratio of 1 mole of the former to 10 moles of the latter.

EXAMPLE 14

A solution in toluene and acetone of 100 parts of polyvinylethyl ether, 55 parts of an interpolymer of 64 parts of 2-ethylhexyl acrylate, 3 parts of methacrylic acid, 3 parts of glycidyl methacrylate, and 30 parts of methyl acrylate, 150 parts of phenol formaldehyde resin, and 100 parts of a homopolymer of 2-ethylhexyl acrylate.

All of the pressure sensitive adhesive disclosed and claimed herein, are normally tacky and under ambient climactic conditions are permanently pressure sensitive and permanently tacky.

We claim:

1. In a process of adhering a substantially rigid object to a larger solid surface to which it conforms, the improvement of applying to said object or said surface a backing-free sheet consisting of a permanently pressure sensitive adhesive composition comprising a crosslinked addition polymer or a crosslinked addition polymer containing a finely divided bodying agent having a particle size of less than 25 microns, said adhesive having the resilience of a soft rubber, a thickness of 8 mils to 125 mils, a Tg of below 0° C., a tensile strength of from about 15 to 60 psi, and a percent elongation at break of from 500 to 3000 percent, and applying said object to said surface with the adhesive sheet therebetween, whereby said object is permanently adhered to said surface.

2. The process of claim 1 in which said adhesive composition comprises said addition polymer containing a finely divided bodying agent having a particle size of less than 25 microns.

3. The process of claim 1 in which said adhesive composition comprises said crosslinked addition polymer.

4. The process of claim 2 wherein the tacky pressure sensitive adhesive contains crosslinked addition polymers derived from monomers including those containing polar functional groups selected from at least one of

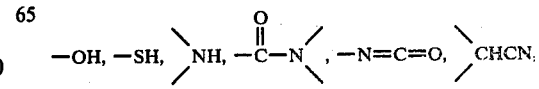

-continued

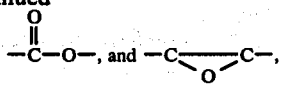

such groups being mutually crosslinkable, self-crosslinkable, or crosslinkable by a separate added chemical compound.

5. The process of claim 4 in which said adhesive is between 10 and 70 mils in thickness, and said Tg is below −15° C.

6. The process of claim 3 wherein the tacky pressure sensitive adhesive contains crosslinked addition polymers derived from monomers including those containing polar functional groups selected from at least one of

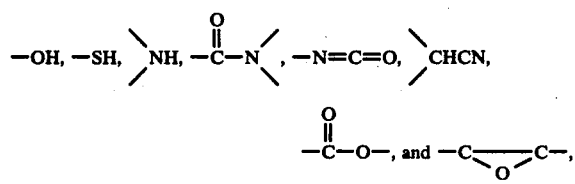

such groups being mutually crosslinkable, self-crosslinkable, or crosslinkable by a separate chemical compound added to said adhesive.

7. The process of claim 6 in which said adhesive is between 10 and 70 mils in thickness, and said Tg is below −15° C.

8. An adhesive product consisting essentially of a backing-free layer of pressure sensitive adhesive on a release coated surface, the adhesive comprising a crosslinked addition polymer or a crosslinked addition polymer containing a finely divided bodying agent having a particle size of less than 25 microns, said adhesive having the resilience of a soft rubber, a thickness of 8 mils to 125 mils, a Tg of below 0° C., a tensile strength of from about 15 to 60 psi, and a percent elongation at break of from 500 to 3000 percent.

9. The product of claim 8 in which the layer is from 10 to 70 mils in thickness, and said Tg is below −15° C.

10. The product of claim 8 in which the crosslinked addition polymer is derived from monomers containing polar functional groups selected from at least one of

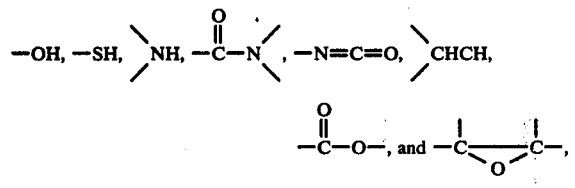

such groups being mutually crosslinkable, self-crosslinkable, or crosslinkable by a separate chemical compound added to said adhesive.

11. A substantially rigid applique for an automobile body, said applique having adhered thereto a relatively massive layer of pressure sensitive adhesive comprising a crosslinked addition polymer or a crosslinked addition polymer containing a finely divided bodying agent having a particle size of less than 25 microns, said adhesive having the resilience of a soft rubber, a thickness of 8 mils to 125 mils, a Tg of below 0° C., a tensile strength of from about 15 to 60 psi and a percent elongation at break from 500 to 3000 percent, whereby the adhesive compensates for irregularities of the applique or the automobile body and absorbs and cushions vibrations and blows applied to said applique.

12. The article of claim 11 in which said adhesive composition comprises said addition polymer containing a finely divided bodying agent having a particle size of less than 25 microns.

13. The article of claim 11 in which said adhesive composition comprises said crosslinked addition polymer.

14. The article of claim 12 in which the pressure sensitive adhesive contains crosslinked addition polymers derived from monomers including those containing polar functional groups selected from at least one of

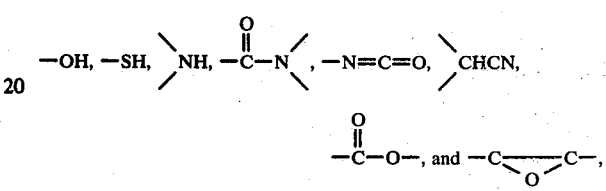

such groups being mutually crosslinkable, self-crosslinkable, or crosslinkable by a separate added chemical compound.

15. The article of claim 13 in which the pressure sensitive adhesive contains crosslinked addition polymers derived from monomers including those containing polar functional groups selected from at least one of

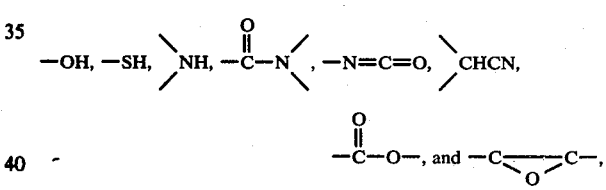

such groups being mutually crosslinkable, self-crosslinkable, or crosslinkable by a separate added chemical compound.

16. The article of claim 14 in which said adhesive sheet is between 10 and 70 mils in thickness and said Tg is below −15° C.

17. The article of claim 15 in which said adhesive sheet is between 10 and 70 mils in thickness and said Tg is below −15° C.

18. The article of claim 11 in which the polymer is an acrylic polymer of 10 to 99.95 parts of an ester of acrylic or methacrylic acid, 0.05 to 20 parts of an unsaturated carboxylic acid monomer and optionally up to 89.95 parts of another ethylenically unsaturated monomer, the total parts being 100, and wherein the adhesive layer has an elastic recovery of from 50 to 90 percent, a William's plasticity of from 2 to about 5, a maximum creep distance of 0.1 inch, and substantially 100 percent elastic recovery on an inch square thereof when compressed in a direction perpendicular to the surface of the sheet of adhesive under a weight of 4 to 25 pounds for 0.1 to 20 minutes.

19. The article of claim 18 in which said ester of acrylic or methacrylic acid is present in an amount of 70 to 99.5 parts, said unsaturated acid monomer is present in an amount of 0.5 to 4.5 parts and the maximum amount of optional ethylenically unsaturated monomer is 29.5.

20. The article of claim 19 in which said optional monomer if used is one or more of methyl acrylate, acrylamide, vinyl acetate, tetradecyl acrylate, pentadecyl acrylate, methyl methacrylate, t-butyl acrylate, butyl methacrylate, styrene, pentadecyl methacrylate, vinyl toluene, methacrylamide, and N-methylol acrylamide.

21. The article of claim 20 in which said ester is of acrylic acid and an alkanol having 2 to about 12 carbon atoms, said unsaturated acid monomer is acrylic acid, methacrylic acid or itaconic acid, wherein said ester is cross-linked by a zinc compound.

* * * * *

UNITED STATES PATENT AND TRADEMARK OFFICE
CERTIFICATE OF CORRECTION

PATENT NO. : 4,145,465                          Page 1 of 3

DATED : March 20, 1979

INVENTOR(S) : Frank Thomas Sanderson and Richard E. Zdanowski

It is certified that error appears in the above–identified patent and that said Letters Patent are hereby corrected as shown below:

Col. 1, line 53 – "neoprane" should read -- neoprene --.

Col. 3, line 29 – "below 31 15 °C." should read -- below -15 °C. --.

Col. 7, lines 6 and 7 – "consideredd" should read -- considered --.

Col. 8, line 28 – "0.50" should read -- 0.05 --.

Col. 9, line 9 – "acrylontrile" should read -- acrylonitrile --.

Col. 9, line 46 – "acetae" should read -- acetate --.

Col. 9, line 51 – "dissocialbe" should read -- dissociable --.

Col. 9, line 54 – "HN$_3$ )" should read -- NH$_3$ ) --.

UNITED STATES PATENT AND TRADEMARK OFFICE
CERTIFICATE OF CORRECTION

PATENT NO. : 4,145,465

DATED : March 20, 1979

INVENTOR(S) : Frank Thomas Sanderson and Richard E. Zdanowski

It is certified that error appears in the above-identified patent and that said Letters Patent are hereby corrected as shown below:

Col. 11, line 9 - "ration" should read -- ratio --.

Col. 11, line 64 - "paticulor" should read -- particular --.

Col. 12, line 16 - "has found" should read -- has been found --.

Col. 12, line 29 - "walls ceilings" should read -- walls, ceilings --.

Col. 12, line 30 - "cooled" should read -- colored --.

Col. 12, line 39 - "polyu" should read -- polymer --.

Col. 13, line 19 - "Gainder" should read -- Gardner --.

Col. 13, line 26 - "silicon-treated" should read -- silicone-treated --.

Col. 13, line 41 - "174" should read -- 1/4 --.

Col. 13, line 35 - "Tensil" should read -- Tensile --.

Col. 13, line 69 - "wit" should read -- with --.

UNITED STATES PATENT AND TRADEMARK OFFICE
CERTIFICATE OF CORRECTION

PATENT NO. : 4,145,465

DATED : March 20, 1979

INVENTOR(S) : Frank Thomas Sanderson and Richard E. Zdanowski

It is certified that error appears in the above-identified patent and that said Letters Patent are hereby corrected as shown below:

Col. 14, line 7 - "silicon-treated" should read -- silicone-treated --.

Col. 14, line 49 - "reptitions" should read -- repetitions --.

Signed and Sealed this

Eighteenth Day of December 1979

[SEAL]

Attest:

SIDNEY A. DIAMOND

Attesting Officer

Commissioner of Patents and Trademarks